(12) United States Patent
Smith, II et al.

(10) Patent No.: US 7,557,964 B2
(45) Date of Patent: Jul. 7, 2009

(54) METHODS, SYSTEMS, AND MEDIA TO CALIBRATE A REPROGRAPHIC SYSTEM

(75) Inventors: James T. Smith, II, Boulder, CO (US); Hong Li, Superior, CO (US); Joseph Stanley Czyszczewski, Longmont, CO (US); Mikel Stanich, Longmont, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 942 days.

(21) Appl. No.: 10/403,971

(22) Filed: Mar. 28, 2003

(65) Prior Publication Data

US 2005/0259276 A1    Nov. 24, 2005

Related U.S. Application Data

(60) Provisional application No. 60/368,873, filed on Mar. 29, 2002.

(51) Int. Cl.
*H04N 1/00* (2006.01)
*H04N 1/46* (2006.01)

(52) U.S. Cl. ............... 358/406; 358/405; 358/504

(58) Field of Classification Search .......... 358/1.1, 358/1.9, 1.11–1.18, 3.24, 401, 405, 406, 358/471, 474, 504
See application file for complete search history.

(56) References Cited

U.S. PATENT DOCUMENTS

| | | | |
|---|---|---|---|
| 5,271,096 A | 12/1993 | Cook | |
| 5,416,890 A | 5/1995 | Beretta | |
| 5,510,896 A | 4/1996 | Wafler | |
| 5,760,913 A | 6/1998 | Falk | |
| 5,777,656 A * | 7/1998 | Henderson | 347/251 |
| 5,805,777 A | 9/1998 | Kutcha | |
| 5,914,474 A | 6/1999 | Spitz | |
| 6,178,007 B1 * | 1/2001 | Harrington | 358/1.9 |
| 6,256,111 B1 * | 7/2001 | Rijavec | 358/1.9 |
| 6,325,288 B1 | 12/2001 | Spitz | |
| 6,327,047 B1 | 12/2001 | Motamed | |
| 7,023,578 B2 * | 4/2006 | Hayes et al. | 358/1.9 |
| 7,038,811 B1 * | 5/2006 | Haikin | 358/1.9 |

(Continued)

FOREIGN PATENT DOCUMENTS

EP    0 546 773 A2    12/1992

(Continued)

*Primary Examiner*—Edward L Coles
*Assistant Examiner*—Thierry L Pham
(74) *Attorney, Agent, or Firm*—Duft Bornsen & Fishman LLP

(57) ABSTRACT

Methods, systems, and media to calibrate a reprographic system are disclosed. Embodiments of the invention may calibrate a component like scanner and/or printer in response to user input and/or coupling the component to the reprographic system. More specifically, embodiments may generate a curve that describes tone differences between an image scanned by a scanner or an image printed by the printer by comparing the outputs to acceptable tone descriptions for the image. Some embodiments comprise a graphical user interface (GUI) to communicate with the user, allowing the user to select user preference curves to change, for example, the brightness of an image being copied. Some embodiments incorporate network and phone system interfaces to communicate with remote components as well as to receive input from and/or output to other systems via email, facsimile, etc.

23 Claims, 5 Drawing Sheets

U.S. PATENT DOCUMENTS

2001/0024284 A1  9/2001  Kise
2002/0021321 A1  2/2002  Nakajima et al.

FOREIGN PATENT DOCUMENTS

| EP | 0 863 458 A2 | 9/1998 |
| EP | 1 091 566 A2 | 4/2001 |
| EP | 1 132 863 A1 | 9/2001 |
| WO | WO 02/13513 A1 | 2/2002 |

\* cited by examiner

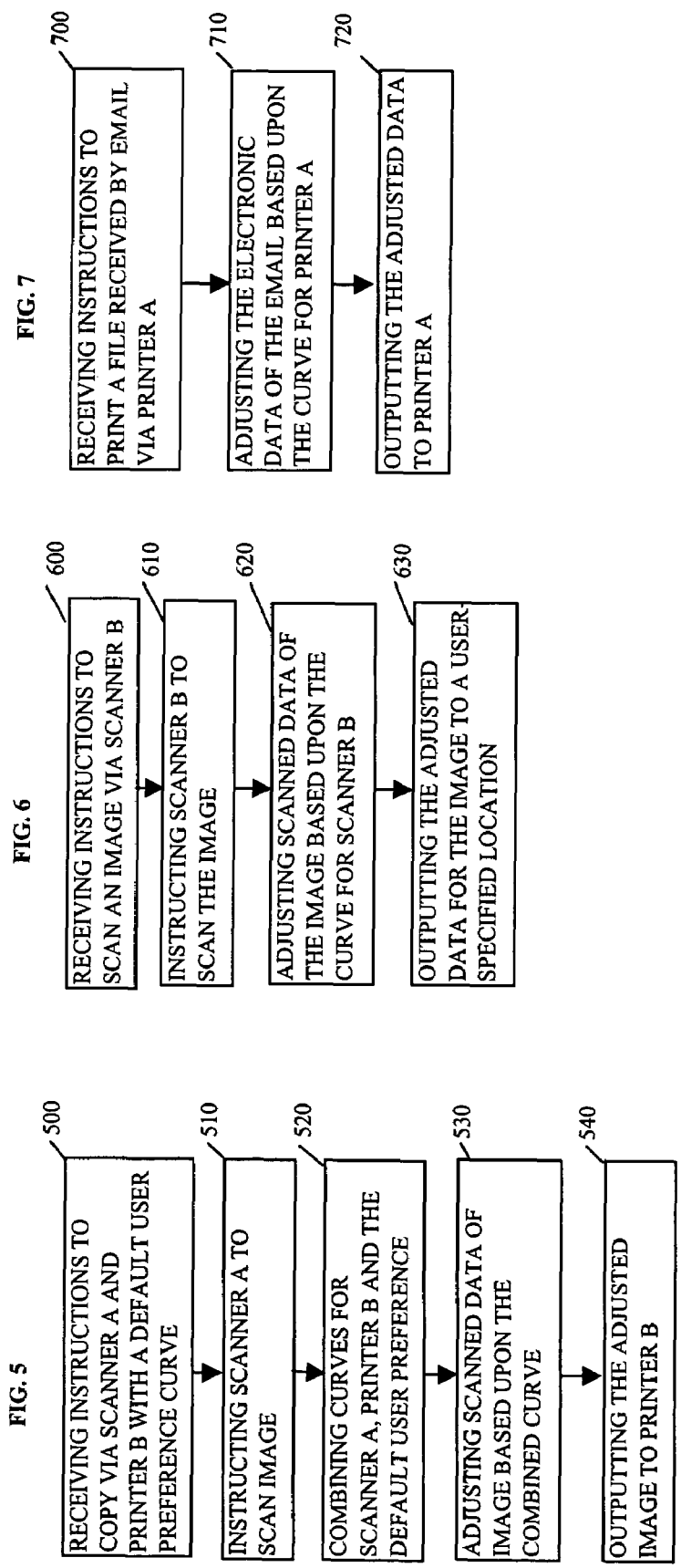

METHODS, SYSTEMS, AND MEDIA TO
CALIBRATE A REPROGRAPHIC SYSTEM

CROSS-REFERENCES TO RELATED APPLICATIONS

Pursuant to 35 USC §119(e), this application claims priority to and benefit of U.S. Provisional Patent Application Ser. No. 60/368,873, filed Mar. 29, 2002, the disclosure of which is incorporated herein in its entirety for all purposes.

FIELD OF INVENTION

The present invention relates to the field of reprographic systems and more particularly to a methods, systems, and media for calibration of the components of a reprographic system and for automatic calibration in response to the touch of a button for average users.

BACKGROUND

A reprographic system is one containing a scanner for scanning paper documents and pictures and storing them into electronic files, image processing software and/or hardware for storing, transmitting, and manipulating the files, and a printer for printing copies of the processed images. An example of a traditional, 'closed' reprographic system is a simple copier. In any such system, the scanner and printer must be calibrated periodically in order to achieve optimum image quality. Such calibration has traditionally been done manually inside the system. This manual calibration process must be performed by a technician with image science skills and the appropriate tools—making it inconvenient to alter calibrations for different applications.

Modern reprographic systems are moving toward a modular structure, often supporting multiple scanners and multiple printers in a defined architecture. Such systems can also include other output destinations for images, such as facsimile, e-mail, etc. In such a system, each component has its own unique image characteristics. Manual calibration of these individual components quickly becomes cumbersome. In addition, it is quite difficult to account for the translations of images between the various combinations of components that can occur in a system including several printers and scanners.

SUMMARY OF THE INVENTION

The problems identified above are in large part addressed by a method and system to calibrate a reprographic system. Embodiments may calibrate a component like scanner and/or printer in response to user input and/or coupling the component to the reprographic system. More specifically, embodiments may generate a curve that describes tone differences between an image scanned by a scanner or an image printed by the printer by comparing the outputs to acceptable tone descriptions for the image. Some embodiments include a graphical user interface (GUI) to communicate with the user, allowing the user to select user preference curves to change, for example, the user may select a more contrast tone curve. Some embodiments incorporate network and phone system interfaces to communicate with remote components as well as to receive input from and/or output to other systems via email, facsimile, etc. Thus, the user can easily re-calibrate a reprographic component for any change in circumstances such as using a different kind of paper, upgrading a scanner, upgrading a printer, or the like.

BRIEF DESCRIPTION OF THE DRAWINGS

Other objects and advantages of the invention will become apparent upon reading the following detailed description and upon reference to the accompanying drawings in which, like references may indicate similar elements:

FIGS. 3-7 depict example flow charts of a method to calibrate a reprographic system, including flow charts focused on calibration and flow charts focused on implementing tone calibration curves within reprographic functions.

DETAILED DESCRIPTION OF EMBODIMENTS

Figure 1:
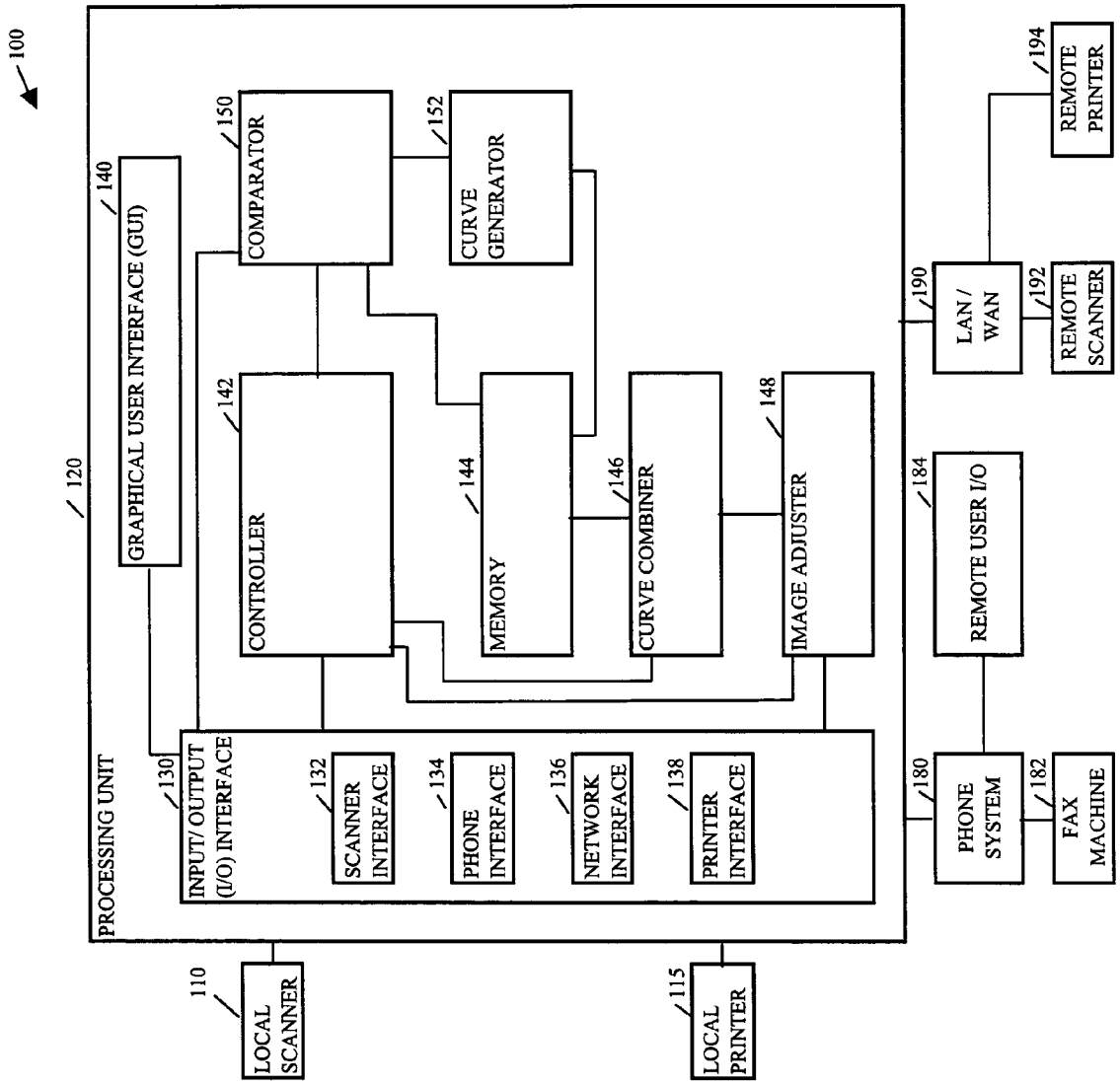
FIG. 1 depicts an embodiment of a reprographic system having local and remote, components and user access.

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, the invention contemplates an automated, user-friendly system and method for calibrating a modular reprographic system. The system includes one or more scanners, one or more printers, and a data processing device or computer connected to them. In a modular embodiment, the scanner(s), printer(s), and computer are discrete element connected to each other via a cable or wireless link. The computer provides a user menu that enables an unskilled user through a process of installing calibration curves corresponding to each scanner and printer. This process is typically invoked when a new scanner or printer is introduced or from time to time to update an existing calibration curve. The user menu guides the user through a process that includes scanning a target having known characteristics (the target data) with the scanner to generate scanner data. The computer receives the scanner data from the scanner via a scanner interface. A comparator coupled to the scanner interface compares the scanner data to the known target data. A curve generator then generates a scanner curve that is indicative of the scanner's characteristic distortion, i.e., the differences, such as tone differences, between the scanner data and the known target data. When the computer receives subsequent data or images from the scanner, it invokes the scanner curve to modify the received data to compensate for the scanner's distortion and thereby provide a calibrated image to the printer or other output device. In particular, the distortion incorporated by a scanner or printer a may be non-linear, so the calibration curves compensate for the distortion to provide a more linear or substantially linear result.

The user interface may further guide the user through a printer calibration process in which the known, digital target is printed and scanned by a calibrated printer. Then, the computer can derive a printer distortion curve by correcting the scanned image for scanner distortion with the calibration curve for the calibrated scanner and comparing this corrected data to the known, digital target data. The resulting printer calibration curve is then stored on the computer and invoked whenever image data is to be sent to the printer to compensate for the printer's characteristic distortion. In this manner, the computer includes a scanner distortion curve and printer distortion curve for each scanner and printer on the system. A document can be reproduced with a minimum of distortion using any scanner/printer combination. The user interface also permit the user to impose preferences on the reproduced document by allowing the creation of a user preference curve that is stored on the system and combined with the printer and scanner curves.

Thus, the system is able to calibrate the scanner and/or printer in response to user input and/or coupling the component to the reprographic system. More specifically, embodiments of the invention may generate a curve that describes tone differences between an image scanned by a scanner or an image printed by the printer by comparing the outputs to acceptable tone descriptions for the image. Some embodiments include a graphical user interface to communicate with the user, allowing the user to select user preference curves to change, for example, the user may select a lighter tone curve. Some embodiments incorporate network and phone system interfaces to communicate with remote components as well as to receive input from and/or output to other systems via email, facsimile, etc. In this way, a user can automatically use different calibrations for a single job being sent to multiple destinations.

Turning now to the drawings, FIG. 1 depicts an embodiment of a system 100 for calibrating a reprographic system. System 100 includes a local scanner 110, a local printer 115, a processing unit 120, a phone system 180 coupled with fax machine 182 and remote user input-output (I/O) 184, and a local area network/wide area network (LAN/WAN) 190. Local scanner 110 and local printer 120 may include one or more scanners and printers in a conventional copy room. In some embodiments, local scanner 110, local printer 115, and processing unit 120 may be adapted to couple to appear as a convention photocopier although these components offer the flexibility of a loosely coupled reprographic system. For instance, a conventional photocopier has a scanner integrated with the printer. Such a scanner is inseparable from the printer physically and functionally. Local scanner 110, on the other hand, can scan images to print to a different local printer, or a remote printer, such as remote printer 194. Printing to remote printer 194 may be more convenient for the user because local printer 115 may run out of ink and/or remote printer 194 may be located in the user's office.

Processing unit 120 includes the software, firmware, and/or hardware to loosely couple and calibrate any scanner and any printer to form a reprographic system. In particular, processing unit 120 couples with a component like a scanner or printer, generates a calibration curve based upon a difference between tone levels output from the component and acceptable or expected tone levels, and applies the curve to image data when the component is used. For instance, when a calibrated scanner is used, the scanner curve generated for that particular scanner provides a basis for adjusting the data scanned from an image by that scanner.

Processing unit 120 may be implemented in the form of software executed on a personal computer via an I/O device such as a touch screen or a specific purpose machine and has an I/O interface 130, a GUI 140, a controller 142, a comparator 150, a curve generator 152, a memory 144, a curve combiner 146, and an image adjuster 148. I/O interface 130 facilitates communication between processing unit 120 and other, typically external, components of a reprographic system. More specifically, I/O interface 130 includes interface hardware and drivers to allow processing unit to scan, print, fax, send and receive emails, send and receive facsimiles, interact with remote users and utilize remote reprographic components. I/O interface 130 includes a scanner interface 132, a phone interface 134, a network interface 136, and a printer interface 138.

Scanner interface 132 can include one or more local scanner ports such as a small computer system interface (SCSI) port, a universal serial bus (USB) port, and a fire wire port. Processing unit 120 may instruct a scanner to feed a form, scan data from that form, and transmit the scanned data to I/O interface 130 via scanner interface 132.

Phone interface 134 facilitates the use of a digital and/or analog phone system, like phone system 180, by processing unit 120. In particular, phone system 180 can be used by processing unit 120 to send and/or receive data via a legacy fax machine like fax machine 182 or a modem or modem software. For example, fax machine 182 may include a scanner to initiate facsimiles and a printer to output facsimiles. A user, via remote user I/O 184, may instruct processing unit 120 to calibrate the scanner associated with fax machine 182. Processing unit 120 may instruct the user, via phone interface 134, to insert a target into fax machine 182 and to transmit or fax the scanned image to processing unit 120 via phone interface 134. The target is a photograph or other substantially accurate rendering of tone levels corresponding to a digital file available to processing unit 120 via memory 144 or a local or remote storage device. Upon receiving the scanned data from fax machine 182, processing unit 120 automatically generates a tone calibration curve for fax machine 182 to improve or optimize the performance of the scanner of fax machine 182 when fax machine is transmitting scanned images to processing unit 120.

In addition, after calibrating the scanner of fax machine 182, processing unit 120 may output or fax a file of a digital step wedge to print via fax machine 182. The digital step wedge provides a print having, for example, 16 steps of tone levels to provide a basis for gauging the accuracy of the printer. Processing unit 120 then instructs the user to scan the printed target with the calibrated scanner of fax machine 182 and compares the scanned data to the original digital step wedge file to calibrate the printer of fax machine 182. Thus, the printer of fax machine 182 is calibrated when used as a printer of the reprographic system by processing unit 120.

Network interface 136 facilitates communication between processing unit 120 and remote components of the reprographic system such as remote scanner 192 and remote printer 194. In some embodiments, network interface 136 may also facilitate communication between processing unit 120 and remote users, office locations, or similar processing units of remote office locations. For instance, LAN/WAN 190 may couple processing unit 120 with a processing unit of a second office via the Internet. A user local to processing unit 120 may want to transfer physical copies of a document to an associate in the second office. In conventional office situations, the user would either fax the document to the second office if the document is short, or send the document by courier or mail. This user, however, decides to scan the document via local scanner 110 and print the document in the second office. Processing unit 120 optimizes the scanned data of the documents with a tone calibration curve for local scanner 110 and the processing unit in the second office optimizes the scanned data for the targeted printer in the second office based upon a tone calibration curve for the targeted printer before printing the document. In other embodiments, network interface 136 may facilitate calibrating and printing emails or email attachments received via calibrated printers.

Printer interface 138 facilitates printing data representing images and documents via calibrated printers like local printer 115 and remote printer 194 via network interface 136. In particular, printer interface 138 includes a network connector such as an RJ-45 connector for an Ethernet connection and protocols to instruct a printer to print an image or document from a file, such as a postscript file.

GUI 140 includes input devices and output devices to interact with a user via a graphical format. GUI 140 may include a transparent touch screen input device overlaying a graphical display to allow the user, for example, to press buttons designed to instruct processing unit 120 to initiate one or more actions. For instance, GUI 140 may display buttons such as calibrate printer, calibrate scanner, scan, print, copy, lighter/darker, less contrast/more contrast, and the like. The user can select a function such as calibrate scanner by simply pressing the calibrate scanner button.

Controller 142 coordinates actions of the reprographic system and facilitates automatic calibration of components of the reprographic system at the touch of a button in response to user input like the calibrate scanner button or user actions such as coupling a scanner to scanner interface 132. Controller 142 responds to user input like the calibrate scanner button by automatically implementing procedures to calibrate a scanner. More specifically, if a new scanner has been detected, such as local scanner 110, and the user presses calibrate scanner, controller 142 will instruct GUI 140 to inform the user to place the target in local scanner 110. In some embodiments, local scanner 110 will indicate that a document has been placed on the flatbed or in the auto-feeder for the scanner. In other embodiments, the user may confirm that the target is in local scanner 110. Then, controller 142 instructs local scanner 110 to scan the document and transmit the scanned data to processing unit 120.

Upon receipt of the scanned data, comparator 150 compares the scanned data to target data (either measurement data or published data) in response to instructions from controller 142. Comparator 150 couples with memory 144 to retrieve target data that includes data describing the expected tone levels from scanning the target and compares the expected tone levels to the actual tone levels reported by local scanner 110. Differences in the expected and actual tone levels are transmitted to curve generator 152. In other embodiments, expected tone levels for the target are stored in local and/or remote locations rather than in memory 144 and can be retrieved via I/O interface 130.

Curve generator 152, in some embodiments, may be adapted for black and white reproduction. In black and white reproduction, red, green, and blue (RGB) formatted data that is typically received from scanners can be directly compared with cyan, magenta, and yellow (CMY) formatted data that is typically generated for printers. On the other hand, embodiments adapted for color reproduction may include converters, such as RGB to CMY and RGB to cyan, magenta, yellow, and black (CMYK) converters for comparison of and curve generation from differences in tone values between scanned data and printer files.

Curve generator 152 generates a curve based upon differences in the tone levels between the target and the data scanned from the target by local scanner 110. In many embodiments, the scanner curves and the printer curves are generated to reflect differences in tone levels based upon a RGB color model. In some embodiments, the scanner curves and the printer curves are generated to reflect differences in tone levels based upon a CMY color model or a CMYK color model.

Similarly, controller 142 responds to a user input like the calibrate printer button by automatically implementing procedures to calibrate a printer. Controller 142 instructs the printer, remote printer 194, to print a digital file of a target and then instructs the user to place the printed target in a calibrated scanner like remote scanner 192. Remote scanner 192 indicates that a document has been placed on the flatbed and controller 142 instructs remote scanner 192 to scan the document. Upon receipt of the scanned data, controller 142 instructs comparator 150 to compare the scanned data to target data, e.g. the digital file used to print the target.

On the other hand, controller 142 also receives instructions from the user to copy, scan, or print. In such instances, controller 142 instructs curve combiner 146 to combine curves related to the action, such as a scanner curve, a user preference curve, and a printer curve for a copy command or a scanner curve and a user preference curve for a scan command. The combined curve can then provide a basis for adjusting data of an image to enhance or optimize image handling by the reprographic system. In other embodiments, a scan command may involve adjusting data scanned from an image with a scanner curve. Combining curves is unnecessary in this latter situation.

Image adjuster 148 receives instructions from controller 142 to receive the scanned data from local scanner 110 and a calibration curve from curve combiner 148 and to implement adjustments to the scanned data based upon the calibration curve. In some embodiments, image adjuster 148 may retrieve a scanner curve for local scanner 110 from memory 144 in response to a scan instruction from the user. Upon adjusting the scanned data, the adjusted, scanned data is output to a location and in a format indicated by the user or to a default location in a default format.

Similarly, in response to a print command, data of an image to print is adjusted based upon a curve generated to calibrate the printer on which the image is printed. The printer curve may also be combined if the user instructs the reprographic system to adjust the print, for example, to be darker or lighter.

In response to a copy command, controller 142 may prompt the user for preferences, wait to receive user preferences, or use the user preferences as selected prior to the user requesting a copy. Since the scanners and printers are loosely coupled in the reprographic system, one user preference may include selecting the scanner and selecting the printer to use for copying. For example, processing unit 120 may be adapted to operate as a console within a personal computer in an office. A scanner, such as local scanner 110, may reside in that office so a user, the occupant of the office, may desire to copy documents with local scanner 110 to a printer, such as remote printer 194, which is located in a more central location in the office but offers high print quality and resolution. The user launches processing unit 120 as a console on the personal computer and selects copy. Since processing unit 120 resides on the users personal computer, the user set default user preferences and default component selections based upon the user's personal preferences. The user's default scanner selection is local scanner 110 and the user's preferences include a custom command in the console to switch to remote printer 194. In other embodiments, a department of a company may adapt the console of processing unit 120 to allow a user to select from printers and scanners assigned to the department while defaulting to a local printer and scanner.

Controller 142 receives the copy command from the user and instructs curve combiner 146 on the curves to combine based upon user preferences. Curve combiner 146 combines a curve for local scanner 110, a curve for remote printer 194, and one or more user preference curves. Image adjuster 148 receives the combined curve and adjusts the data scanned from each page of the document fed to local scanner 110 prior to printing the documents via remote printer 194.

Figure 2:
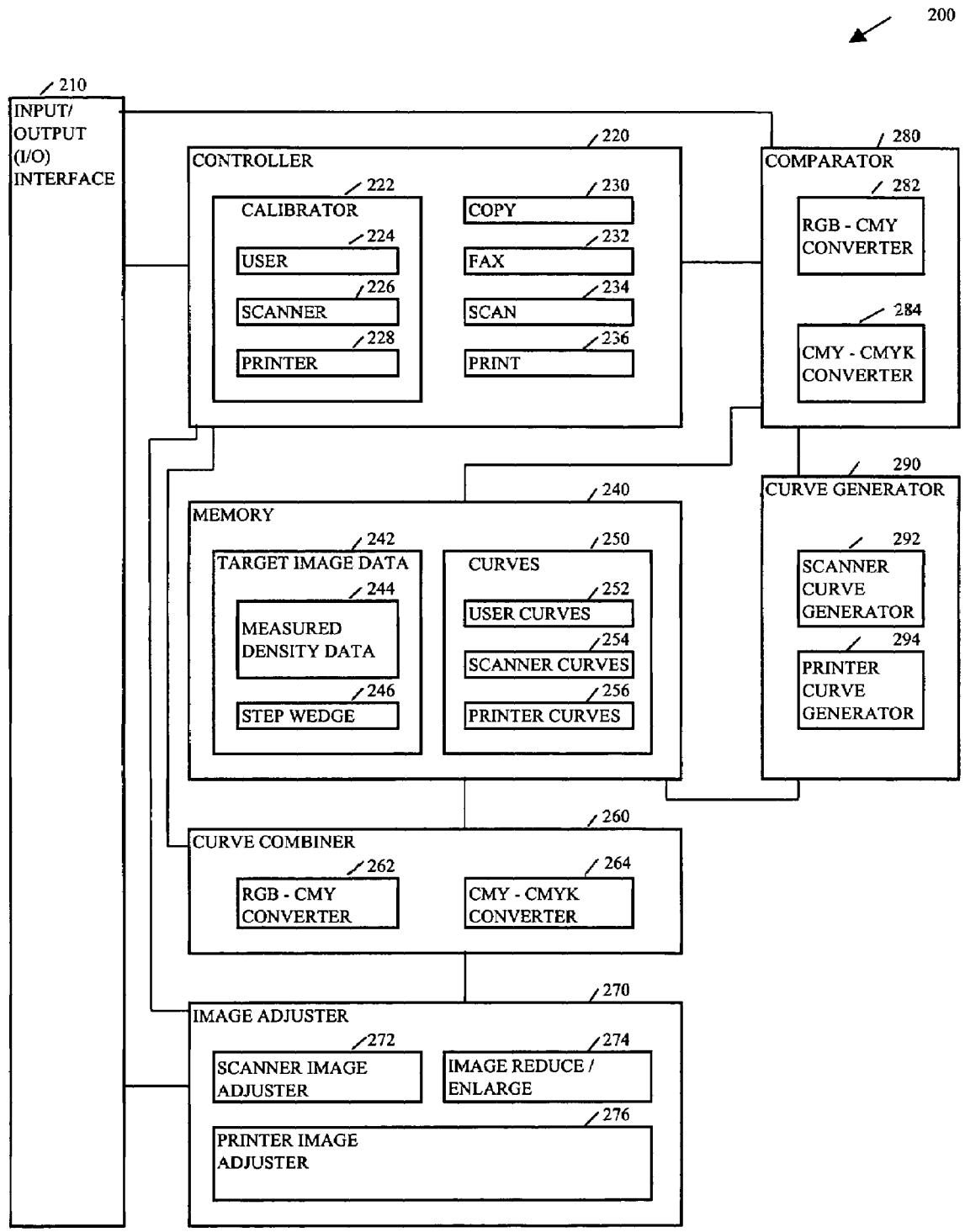
FIG. 2 depicts an embodiment of an apparatus for automatically calibrating a reprographic system.

Referring now to FIG. 2, there is shown an embodiment of an apparatus 200 to calibrate a reprographic system. Apparatus 200 includes an I/O interface 210, a controller 220, a comparator 280, a curve generator 290, memory 240, curve combiner 260 and image adjuster 270. I/O interface 210 provides an interface to facilitate communication with users, scanners, printers, fax machines, and the like.

Controller 220 is designed to coordinate functionality of the reprographic system in response to communication with a user. Controller 220 includes calibrator 222, copy 230, fax 232, scan 234, and print 236. Calibrator 222 coordinates calibration of scanners and printers or imposes user preferences in response to the user pressing a button. More specifically, calibrator 222 includes user 224, scanner 226, and printer 228. User 224 includes circuitry to allow a user to adjust tone qualities of images handled by the reprographic system such as contrast, lightness and darkness, and other qualities such as size enlargement and reduction. For instance, a user may press a calibration button to indicate a desire to modify user calibration preferences that initiates user 224. User 224 may prompt the user to determine the preferences and based upon answers, temporarily or permanently change the user preferences for copying operations. The user selects an increase in contrast when copying documents as a default setting. As a result a pointer in memory 240 points to a user preference tone calibration curve in user curves 252 that is designed to increase the contrast of image data.

Scanner 226 includes circuitry to calibrate or re-calibrate a scanner. Upon initiation of scanner 226, scanner 226 instructs the user to place a scanner calibration target that has a corresponding electronic file in target image data 242 of memory 240 in the scanner. The scanner calibration target is scanned and the scanner is automatically calibrated to produce an image quality based upon the margin of error in the tone quality produced by the scanner. Scanner 226 instructs comparator 280 to compare the tone quality of the scanned data against the measured density data 244 of target image data 242 to determine differences in tone levels indicated in measured density data 244 and the scanned data. The differences in tone quality are then used by curve generator 290 to generate a calibration curve for the scanner and the scanner calibration curve is stored in scanner curves 254.

Similarly, printer 228 is designed to calibrate or re-calibrate a printer. Although the same target can be used to calibrate the printer, a step wedge 246 is particularly well suited for calibrating many printers. Printer 228 prints step wedge 246 to the printer, prompts the user to place the printed target in a calibrated scanner and scans the printed target. Upon comparing the data scanned from the printed target against step wedge 246, curve generator 290 generates a printer tone calibration curve and stores the curve in printer curves 256.

Copy 230 initiates a function similar to a conventional photocopier, however, unlike the conventional copy function, copy 230 allows the user to specify one or more scanners to perform the document scans and one or more local or remote printers to print the copies. For instance, a memo is created and needs to be delivered to several persons of an organization. Copy 230 facilitates selection of multiple personal printers of persons within the organization. Thus, after selecting the personal printers of persons that should receive the memo, the memo is scanned once, and dynamically calibrated and delivered to the personal printer of every person on the list to receive the memo. Other embodiments, provide for group lists.

Fax 232 initiates a function similar to a conventional fax machine, however, the scanner of the fax machine may be optimized. Alternatively, a modem fax may be used in conjunction with a scanner. Fax 232 also provides for faxing to group lists.

Scan 234 initiates a function similar to copy 230 but the scan 234 delivers the output in the form of an electronic file. The electronic file may be saved to one or more locations on a network, faxed to a fax machine or computer, or emailed.

Print 236 initiates a function to print an electronic file like an email attachment or a text file to one or more local or remote printers. For instance, the memo may be printed via the reprographic system to personal printers of several persons of an organization since print 236 facilitates for selection of multiple personal printers.

Comparator 280 compares tone levels associated with scanned data against tone levels indicated in electronic files. The tone differences detected provide a basis for generating a calibration curve for a component of the reprographic system. In particular, when an uncalibrated scanner scans an image, the calibration curve includes errors or calibration issues related to the scanner. On the other hand, when a calibrated scanner scans a printed image, the calibration curve indicates errors or calibration issues related to the printer.

In several embodiments, comparator 280 is designed for black and white reproduction. Scanned data and target data may be directly compared without conversion. On the other hand, in embodiments adapted for color scanning and/or printing, comparator 280 may include an RGB-CMY converter 282 and a CMY-CMYK converter 284. RGB-CMY converter converts color images between an RGB color format and a CMY color format to facilitate comparison of data scanned against step wedge 246 when step wedge 246 is formatted in CMY to print via a printer. CMY-CMYK converter converts between CMY and CMYK color formats when step wedge 246 is formatted in CMYK. In other embodiments, step wedge 246 may include data formatted in RGB, CMY and CMYK formats to avoid conversions within comparator 280.

Curve generator 290 generates tone calibration curves for scanners and printers based upon results from comparator 280. In particular, curve generator 290 generates a curve or gathers points of data along a curve that describes errors in tone levels associated with scanning an image or printing an image. Several embodiments for black and white reproduction may directly compare tone levels with expected tone levels. In embodiments wherein color scanning and printing may be available, curve generator 290 may include a scanner curve generator 292 to generate a curve for a color scanner in an RGB color format and a printer curve generator 294 to generate a curve for a color printer in a CMY or CMYK color format.

Curve combiner 260 computes or updates a system calibration curve to calibrate one or more components of the reprographic system dynamically by combining each individual component tone calibration curve and user preference curve. For example, to produce copies of a large document more quickly, the document may be split between more than one scanner and more than one printer. In such circumstances, the calibration of each scanner and printer to standard tone qualities provides substantially uniform tone levels throughout the copy. More specifically, tone distortions associated with a scanner or printer may vary in a non-linear manner across the tone spectrum. Therefore, tone calibration curves are designed to compensate for the non-linear distortion, resulting in a substantially linear tone relationship between the actual image and the scanned and/or printed image. Further, for reproduction systems adapted for color reproduction, curve combiner 260 may include an RGB-CMY converter 262 and a CMY-CMYK converter 264 to facilitate combinations of calibration curves wherein one curve is in CMY format or CMYK format and another curve is in RGB format.

Image adjuster 270 couples with the I/O interface 210 to adjust data associated with images based upon the tone differences described by a component calibration curve. Image adjuster 270 receives instructions from controller 220 to implement adjustments to scanned data based upon the combined calibration curve received from curve combiner 260. Image adjuster 270 includes scanner image adjuster 272, image reduce/ enlarge 274, and printer image adjuster 276. Scanner image adjuster 272 may adjust data scanned from a scanner by locating a scanner calibration curve in scanner curves 254 that is associated with the scanner and modifying tone levels in the scanned data based upon the scanner calibration curve. Image reduce/ enlarge 274 is designed to reduce or enlarge the image in response to user input.

Printer image adjuster 276 may adjust data to print to a printer by locating a printer calibration curve in printer curves 256 that is associated with the printer and modifying tone levels in the image data based upon the printer calibration curve. In other embodiments, printer image adjuster 276 may convert data scanned from a scanner into a postscript file or the like to forward to the printer.

Figure 3:
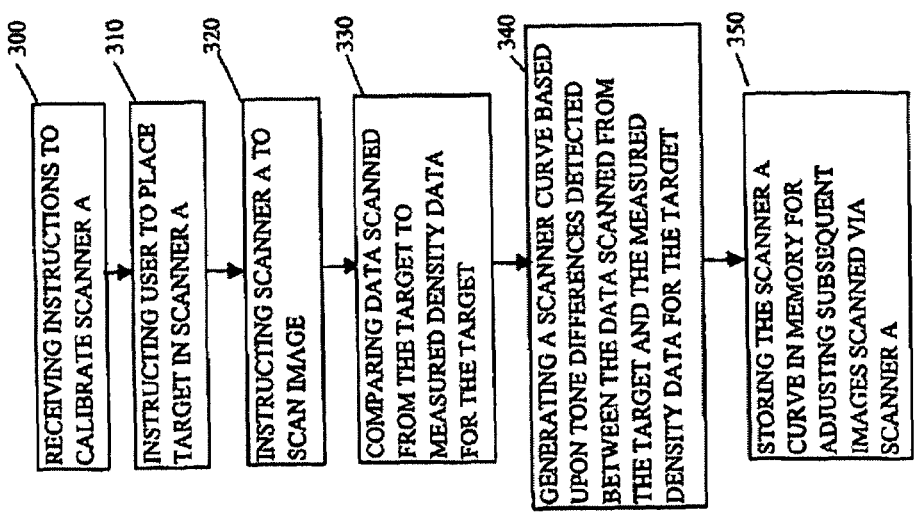

FIG. 3 depicts an example flow chart of a method to calibrate a scanner. The flow chart begins with element 300, receiving instructions to calibrate scanner A. The instructions may result from user input or may result from a user action such as coupling the scanner to the reprographic system. In some embodiments, a controller may receive instructions to calibrate a scanner and the scanner to be calibrated is identified at a memory location.

In element 310, the user is instructed to place a target in scanner A. For instance, the reprographic system may include one or more targets in the form of prints or photographs designed to facilitate calibration of scanners. In such embodiments, a data storage unit such as non-volatile memory or a compact disk read only memory (CD ROM) of the reprographic system includes digital files with measured density data corresponding to the targets. The digital files describe the tone levels associated with the targets to an acceptable level of accuracy. In many of these embodiments, the target is a standard IT8 target like Kodak Q60R1.

In element 320, instructing scanner A to scan image causes the scanner to digitize the image, typically in an RGB format. Then element 330 compares the data scanned from the target to measured density data (measured with colorimeter or densitometer) for the target to determine differences in tone levels scanned by scanner A and the acceptable values described in the measured density data.

Element 340, generates a scanner curve based upon the tone differences detected between the data scanned from the target and the measured density data for the target. Scanned data is obtained from the target by averaging tone levels across a patch of data and comparing the tone levels with measured density data that is stored in the system for that target (both scanned and measurement data are re-normalized for dynamic range expansion). In many embodiments, the curve is a series of data points representing tone values and the error encountered when scanning that tone with scanner A. In such embodiments, tone levels that fall between these data points may be interpolated from the data points. In other embodiments, a curve fitting algorithm may determine an equation of a curve to describe the error through a range of the tone spectrum, allowing for potentially more accurate corrections for tone levels between the data points.

Element 350 stores the calibration curve for scanner A in memory for adjusting subsequent images scanned via scanner A. More specifically, the curve is typically stored in non-volatile memory coupled with the reprographic system. In some embodiments, the curves may be available to similar but remote reprographic systems such as reprographic systems in other offices of an organization.

Figure 4:
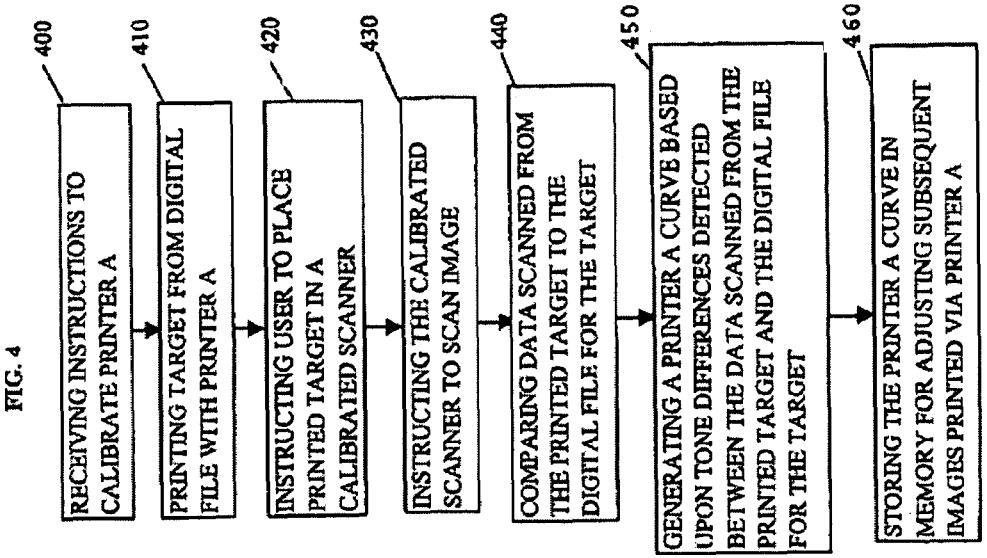

FIG. 4 depicts an example flow chart of a method to calibrate a printer. The flow chart begins with element 400, receiving instructions to calibrate printer A. More specifically, the user couples a printer to a local printer port of the reprographic system and, upon recognizing the new, uncalibrated printer A, the reprographic system responds by prompting the user to calibrate printer A. The user confirms the calibration request so element 410 prints a target to printer A. For instance, the reprographic system may include one or more targets in the form of digital files to print when calibrating printers. In such embodiments, a data storage unit such as non-volatile memory or a CD ROM of the reprographic system includes the digital files corresponding to the targets. The digital files, such as a 16 step, digital step wedge, include a range of tone levels to test printer A's ability to reproduce tones at tone levels throughout a spectrum of tones.

Element 420 instructs the user to place the printed target in a calibrated scanner since printer A is uncalibrated and the tone levels of the printed target may vary from acceptable tone quality. In element 430, scanner A is instructed to scan the printed target, causing the scanner to scan and average the printed target over each patch of tone to obtain scanned data.

Then element 440 compares the data scanned from the target and averaged to the digital file associated with the printed target to determine differences in tone levels printed by printer A. In some embodiments, the scanned data describes tone levels in an RGB format and the digital file describes tone levels in a CMY or CMYK format so a converter may convert from one format to another to facilitate the comparison for color reprographic systems. Such embodiments may also generate printer tone calibration curves based upon tone discrepancies in a CMY or CMYK format. Thus, the scanned data may be converted to CMY or CMYK prior to the comparison to facilitate generation of the printer calibration curve.

Element 450, generates a printer calibration curve based upon the tone differences detected between the data scanned from the printed target and the measured density data for the target. In many embodiments, the curve is generated based upon the assumption that minimal errors resulted from a scan by the calibrated scanner. In some of these embodiments, data noise reduction filters may be implemented to reduce errors incorporated by the calibrated scanner.

Element 460 stores the calibration curve for printer A in memory for adjusting subsequent images to print via printer A. The curve is typically stored in non-volatile memory coupled with or within a component of the reprographic system and, in some embodiments, one or more default calibration curves may be stored as a starting point to operation prior to calibration. Thus, the user can easily re-calibrate a reprographic component for any difference or change in circumstances such as using a different kind of paper, upgrading a scanner, upgrading a printer, or the like.

FIG. 5 depicts an example flow chart of a method to copy via calibrated scanner and a calibrated printer. The flow chart begins with element 500, receiving instructions to copy via scanner A and printer B with a default user preference curve. More specifically, the user requests a copy of a document located in scanner A to be copied and printed to printer B and did not request a specific user preference such as increase or decrease contrast. On the other hand, the default user preference may include one or more preferences. For example, the main function of the reprographic equipment in an office may be to copy text documents. The text documents may be repeatedly copied which can deteriorate the contrast of the documents and the dark tone of the text so the default user preferences are set to increase contrast one level and increase darkness by one level. Increasing the contrast by one level is associated with a user preference curve and increasing darkness by one level is associated with a second user preference curve, both of which are located in memory.

After instructing scanner A to scan the document(s) (element 510), the reprographic system combines the user preference curves and the curves for scanner A and printer B into a single, combined curve (element 520). The combined curve offers a one to one correspondence between substantially accurate tone levels and tone levels associated with the scanned data to facilitate implementation of the calibrations for scanner A and printer B in addition to incorporating tone adjustment preferences of the user.

Adjusting scanned data of the document(s) based upon the combined curve (element 530) adjusts the scanned data before transmitting the scanned data to the printer. Other embodiments may include converting from RGB format to CMY or CMYK format to print the scanned data. Then, element 540 completes the copy function by outputting the adjusted, scanned data of the document(s) to printer B.

FIG. 6 depicts an example flow chart of a method to scan image via scanner B. The flow chart begins with element 600, receiving instructions to scan an image via scanner B. In other embodiments, the user may also include user preferences such as a modification of the contrast and/or brightness for the resulting scanned data.

In element 610, the reprographic system instructs scanner B to scan the image. In other embodiments, the reprographic system may instruct the user to press a scan button when the image is placed in the scanner. Then element 620 adjusts the scanned data based upon the tone calibration curve associated with scanner B and the adjusted, scanned data is output to a user-specified location (element 630).

FIG. 7 depicts an example flow chart of a method to print a file received by email via printer A. The flow chart begins with element 700, receiving instructions to print a file received by email via printer A. More specifically, the user requests that one or more emails be forwarded to the reprographic system to be printed. In other embodiments, an email address assigned to the reprographic system may designate emails to print upon receipt. The persons for whom the email is addressed can be recognized by the reprographic system and a default printer, the printer in the office of that person, is designated as the printer for printing that email.

Upon receipt of the email and determination of the selected printer, printer A, the calibration curve for printer A is used to adjust the image of the email for printing to printer A (element 710). Thus, when the email is output to printer A, the print is high quality. Further, over time the tone quality output by printers tend to deteriorate so the printer can be easily and automatically re-calibrated to adjust for the deteriorated tone quality.

Figure 8:
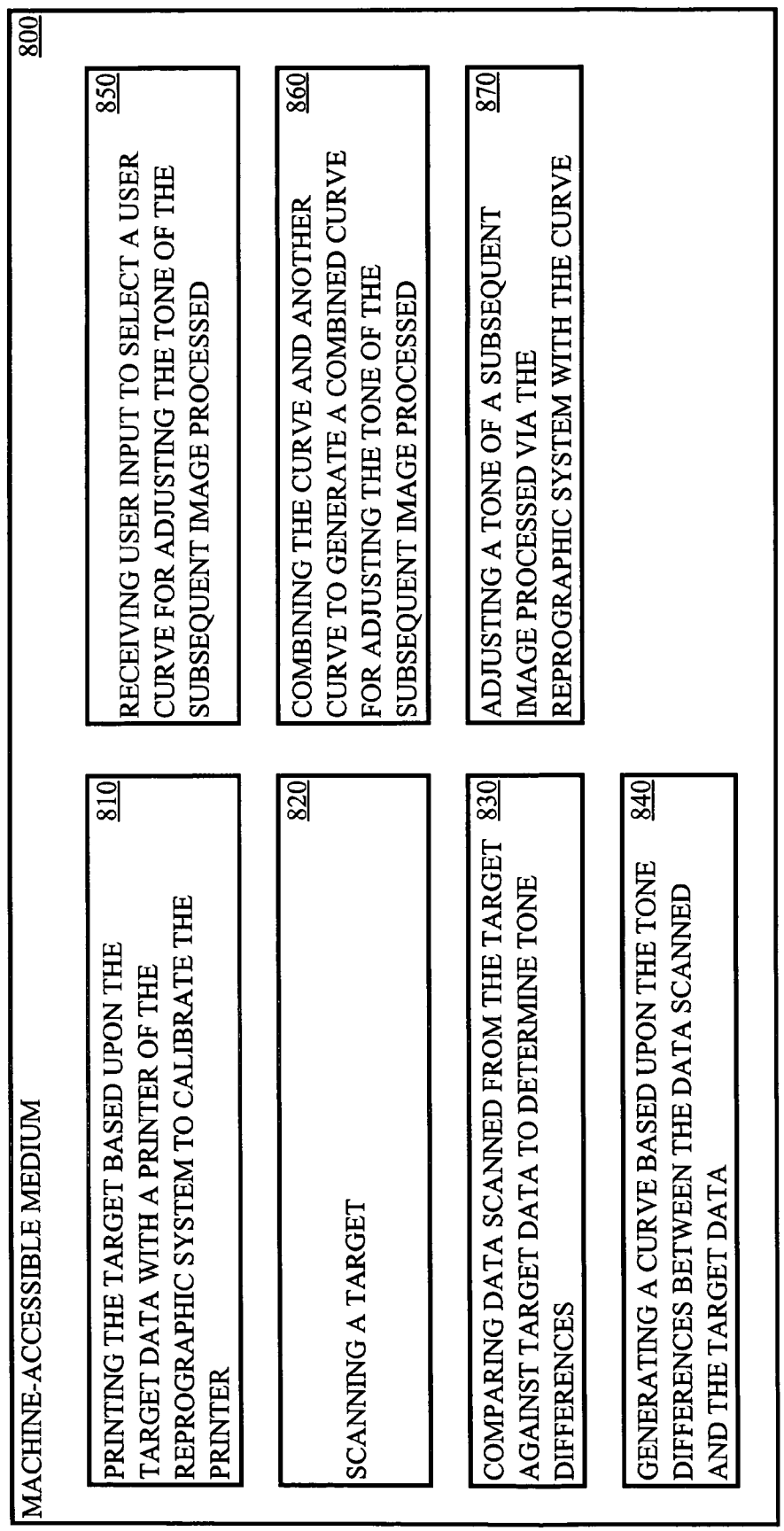
FIG. 8 depicts an embodiment of a machine-accessible medium comprising instructions to calibrate a reprographic system.

Referring now to FIG. 8, a machine-accessible medium embodiment of the present invention is shown. A machine-accessible medium includes any mechanism that provides (i.e. stores and or transmits) information in a form readable by a machine (e.g., a computer), that when executed by the machine, can perform the functions described herein. For example, a machine-accessible medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Some embodiments of the present invention can include more than one machine-accessible medium depending on the design of the machine.

Medium 800 may include instructions for printing the target based upon the target data with a printer of the reprographic system to calibrate the printer (element 810); scanning a target (element 820); comparing data scanned from the target against target data to determine tone differences (element 830); generating a curve based upon the tone differences between the data scanned and the target data (element 840); receiving user input to select a user curve for adjusting the tone of the subsequent image processed (element 850); combining the curve and another curve to generate a combined curve for adjusting the tone of the subsequent image processed (element 860); and adjusting a tone of a subsequent image processed via the reprographic system with the curve (element 870).

Instructions for printing the target based upon the target data with a printer of the reprographic system to calibrate the printer (element 810) prints the target in response to a user input requesting calibration of the printer, to gauge the difference between the tone setting according to the electronic target file and the target as printed by the printer to be calibrated. In many embodiments, the printed target includes areas or patches having a color tone so that the area can be scanned and averaged to determine the actual tone printed. The tone levels, conventionally measured by skilled technicians with a calorimeter or densitometer, can be measured instead by a calibrated scanner.

Instructions for scanning a target (element 820) scans a target such as a photograph or printed target having sufficiently known tone levels to calibrate a scanner, or scans a printed target from an uncalibrated printer for calibrating that printer. For instance, the calibration of a scanner changes over time so a user may decide to re-calibrate the scanner. The user simply places the scanner calibration target in the scanner and presses a calibrate button or selects a calibrate function for the scanner. The reprographic system responds with instructions for comparing data scanned from the target against target data to determine tone differences (element 830).

Instructions for comparing data scanned from the target against target data to determine tone differences (element 830) compares the scanned data from the target against target data, like measured density data for a scanner calibration target, and calibrates the scanner by generating a new tone calibration curve or modifying a current version of the calibration curve. When calibrating a printer, on the other hand, the scanned data for the target is compared against tone levels described in the digital file used to print the target.

Instructions for generating a curve based upon the tone differences between the data scanned and the target data (element 840) includes generating a calibration curve based upon tone differences between the scanned data from a scanner of the reprographic system and the measured density data. In particular, a scanner scans and averages tone levels over areas of the target and the tone levels determined are compared against expected tone levels to generate a difference for multiple tone levels. The differences are used during image adjustment to correct for the calibration errors in the hardware or firmware of the corresponding scanner or printer. Curve fitting or interpolation can also be used to determine tone levels that fall between data points in a calibration curve.

Instructions for receiving user input to select a user curve for adjusting the tone of the subsequent image processed (element 850) includes accepting user preferences such as lighter/darker, higher/lower contrast, etc. For instance, a number of curves describing changes to tone levels based upon one or more increases in darkness is stored in memory such that the user can select one of the curves to modify data of images. More specifically the user may want to increase the darkness on drawings being copied from a calibrated scanner to a calibrated printer so the user presses the darker button one or more times which selects a darker tone calibration curve for use when adjusting the data for the image with calibration curves.

Instructions for combining the curve and another curve to generate a combined curve for adjusting the tone of the subsequent image processed (element 860) includes combining calibration curves such as a printer calibration curve, a scanner calibration curve and a user preference calibration curve. In alternative embodiments, one or more of the calibration curves may be used in a separate adjustment of the image data.

Instructions for adjusting a tone of a subsequent image processed via the reprographic system with the curve (element 870) includes adjusting the tone associated with data scanned from the subsequent image by the scanner by correcting for the tone differences described by the curve and, in color reprographic systems, converting image data between an RGB format and a CMY format.

It will be apparent to those skilled in the art having the benefit of this disclosure that the present invention contemplates involve methods, systems, and media to calibrate a reprographic system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for calibrating a reprographic system, the method comprising:
   scanning, with a scanner, a target having target data to obtain scan data;
   comparing the scan data against the target data to determine scanner difference data;
   generating a scanner curve based upon the scanner difference data;
   scan adjusting a subsequent image processed via the scanner with the scanner curve;
   printing, with a printer, the target to obtain a printed target;
   scanning, with the scanner, the printed target to obtain unadjusted print data;
   adjusting the unadjusted print data using the scanner curve to obtain print data;
   comparing the printer data against the target data to obtain printer difference data;
   generating a printer curve based upon the printer difference data; and
   print adjusting a subsequent image processed via the printer with the printer curve.

2. The method of claim 1, wherein printing the target comprises printing a step wedge.

3. The method of claim 1, wherein generating the printer curve comprises generating a curve based upon tone differences between the printed target and the target data.

4. The method of claim 3, wherein print adjusting comprises adjusting a tone level associated with a file to print the subsequent image based upon the printer curve before outputting the file to the printer.

5. The method of claim 1, further comprising receiving user input to select a user curve for adjusting a tone of the subsequent image processed.

6. The method of claim 1, further comprising combining the scanner curve and printer curve to generate a combined curve for adjusting a tone of an image processed with the scanner and the printer.

7. The method of claim 1, wherein scanning the target comprises scanning a standard IT8 target.

8. The method of claim 7, wherein comparing the scan data comprises comparing scan data from the target against measured density data for the standard IT8 target.

9. The method of claim 8, wherein generating the scanner curve comprises generating the scanner curve based upon tone difference between the scanned data form a scanner of the reprographic system and the measured density data.

10. The method of claim 1, wherein scan adjusting comprises adjusting a tone associated with data scanned from the subsequent image by the scanner by correcting for the tone differences described by the scanner curve.

11. The method of claim 1, wherein adjusting comprises converting image data between an RGB format and a CMY format.

12. An apparatus for calibrating a reprographic system, the apparatus comprising:
   a scanner interface to receive data scanned from a target;
   a comparator coupled with the scanner interface to compare the data scanned with target data;
   a curve generator couple with the comparator to generate a scanner curve describing differences between the data scanned and the target data;
   an image adjuster coupled with the scanner interface to adjust data associated with a subsequent image based upon the tone difference described by the scanner curve; and
   a module to adjust scanned printed target data with the scanner curve to obtain adjusted print data and to compare the adjusted print data against the target data to obtain a printer curve.

13. The apparatus of claim 12, further comprising a curve combiner coupled with the image adjuster to combine modifications indicated by the scanner curve with modifications indicated by the printer curve.

14. The apparatus of claim 12, further comprising a controller coupled with the curve generator to generate curves for calibrating components of the reprographic system in response to input from a user.

15. The apparatus of claim 14, wherein the controller comprises circuitry coupled with the image adjuster to adjust data associated with an image based upon a user preference curve selected in response to input from a user.

16. The apparatus of claim 14, further comprising a network interface coupled with the controller to communicate with remote components of the reprographic system.

17. The apparatus of claim 14, further comprising a phone system interface coupled with the controller to communicate with a facsimile machine.

18. The apparatus of claim 12, wherein the comparator comprises an RGB-CMY converter coupled with the scanner interface to compare data having tones described via red, green, and blue colors against data having tones described via cyan, magenta, and yellow colors.

19. The apparatus of claim 12, wherein the curve generator comprises scanner circuitry to generate the scanner curve and printer circuitry to generate the printer curve.

20. A computer readable medium containing instructions, which when executed by a machine, cause said machine to perform operations, comprising:

scanning, with a scanner, a target having target data to obtain scan data;

comparing the scan data against the target data to determine scanner difference data;

generating a scanner curve based upon the scanner difference data;

scan adjusting a subsequent image processed via the scanner with the scanner curve;

printing, with a printer, the target to obtain a printed target;

scanning, with the scanner, the printed target to obtain unadjusted print data;

adjusting the unadjusted print data using the scanner curve to obtain print data;

comparing the print data against the target data to obtain printer difference data;

generating a printer curve based upon the printer difference data; and print adjusting a subsequent image process via the printer with the printer curve.

21. The computer readable medium of claim 20, further comprising receiving user input to select a user curve for adjusting a tone of the subsequent image processed.

22. The computer readable medium of claim 20, further comprising combining the scanner curve and the printer curve to generate a combined curve for adjusting a tone of the subsequent image processed.

23. The computer readable medium of claim 20, wherein adjusting comprises converting image data between an RGB format and a CMYK format.

* * * * *

UNITED STATES PATENT AND TRADEMARK OFFICE
CERTIFICATE OF CORRECTION

PATENT NO. : 7,557,964 B2
APPLICATION NO. : 10/403971
DATED : July 7, 2009
INVENTOR(S) : James T. Smith, II et al It is certified that error appears in the above-identified patent and that said Letters Patent is hereby corrected as shown below:

At column 13, line 57, please correct "printer data" to read "the print data".

At column 14, line 19, please correct "data form a scanner" to read "data from a scanner".

Signed and Sealed this

Tenth Day of November, 2009

David J. Kappos
*Director of the United States Patent and Trademark Office*